United States Patent [19]

Botzman

[11] Patent Number: 4,804,028

[45] Date of Patent: Feb. 14, 1989

[54] NON-STAINING VULCANIZED ELASTOMERIC COMPOSITION AND TIRES HAVING SIDEWALLS COMPRISING SAID COMPOSITION

[75] Inventor: Thomas J. Botzman, Cuyohoga Falls, Ohio

[73] Assignee: The Goodyear Tire & Rubber Company, Akron, Ohio

[21] Appl. No.: 836,367

[22] Filed: Mar. 5, 1986

[51] Int. Cl.$^4$ .................... C08L 9/00; C08L 23/16; B60C 1/00

[52] U.S. Cl. ..................... 152/525; 152/DIG. 12; 428/517; 525/236; 525/237; 525/211

[58] Field of Search ............... 428/517; 521/526; 525/211, 236, 237; 152/525, DIG. 12

[56] References Cited

U.S. PATENT DOCUMENTS

| | | | |
|---|---|---|---|
| 3,008,921 | 12/1961 | Kline | 524/206 |
| 3,658,769 | 4/1972 | Kline | 526/308 |
| 3,714,122 | 1/1973 | Kline | 526/229 |
| 3,767,628 | 10/1973 | Kline | 526/262 |
| 3,907,893 | 9/1975 | Parker | 564/135 |
| 3,937,862 | 2/1976 | Dillenschneider | 428/517 |
| 3,953,402 | 4/1976 | Kline | 526/195 |
| 3,962,187 | 6/1976 | Kline | 526/313 |
| 3,970,133 | 7/1976 | Hopper | 152/525 |
| 3,975,360 | 8/1976 | Kline | 524/334 |
| 4,022,831 | 5/1977 | Spoerke | 564/135 |
| 4,117,240 | 9/1978 | Kline | 560/221 |
| 4,147,880 | 4/1979 | Kline | 560/142 |
| 4,152,319 | 5/1979 | Kline | 524/222 |
| 4,153,748 | 5/1979 | Bischoff | 428/517 |
| 4,165,333 | 8/1979 | Kline | 558/257 |
| 4,286,105 | 8/1981 | Parker | 564/205 |
| 4,452,939 | 6/1984 | Parker et al. | 524/551 |
| 4,481,337 | 11/1984 | Burlett et al. | 525/340 |
| 4,521,574 | 6/1985 | Patterson et al. | 526/204 |
| 4,645,793 | 2/1987 | Van Hellens et al. | 524/211 |

OTHER PUBLICATIONS

"Polymer-Bound Rubber Chemicals—Some Aspects of Optimized Polymer Binders", Ehrend and Morche, *Rubber World*, Oct. 1984, pp. 24, 25, 27, 28 and 29.

"Reviewing an Age Old Problem", Menough, *Rubber World*, Oct. 1984, pp. 14–15.

*Primary Examiner*—Allan M. Lieberman
*Attorney, Agent, or Firm*—L. R. Drayer

[57] ABSTRACT

A vulcanizable composition which comprises diene rubber, an EPDM that has been modified to crosslink with the diene rubber, and a polymeric antidegradant, while being substantially free of staining antidegradants. This composition has particular utility in the sidewalls of tires.

4 Claims, No Drawings

NON-STAINING VULCANIZED ELASTOMERIC COMPOSITION AND TIRES HAVING SIDEWALLS COMPRISING SAID COMPOSITION

TECHNICAL FIELD

This invention relates to a non-staining vulcanized elastomeric composition, and more specifically to a vulcanized article such as a tire having at least an outer layer that is substantially free of staining antidegradants while still exhibiting good aging characteristics.

BACKGROUND ART

Vulcanized elastomeric compositions frequently contain antioxidants and antiozonants for the purpose of enhancing the aging properties of the composition. The most commonly employed antioxidants and antiozonants are classified as staining antidegradants because they are in physical admixture with the polymer and can migrate to a surface of an article and discolor the article. Some of these straining antidegradants can even cause contact staining of a second article that comes into contact with the article containing the staining antidegradants. While the new elastomeric composition has particular utility in tires, it could be used as an outer layer of other elastomeric articles such as belts, hoses and roofing.

It has been a common practice in the tire art that when a white stripe, or white lettering, is to be placed on a tire sidewall a barrier strip of non-staining material is placed between the white rubber and the black rubber which contains staining antidegradants. If a barrier strip is not employed the surface of the white rubber will be discolored by the staining antidegradants that migrate to the surface. This new composition has particular utility when used with liquid coating materials such as taught in U.S. Pat. No. 4,535,114 and U.S. Pat. No. 4,668,728. These liquid coating materials are used for painting indicium on a sulfur cured rubber article, and the indicium would be discolored by the staining antidegradants contained in the prior art compositions. That problem of staining the indicia can be overcome with the present invention.

Another disadvantage in relying upon staining antidegradants for antioxidant and antiozonant properties in a tire, especially a truck tire or aircraft tire, is that over an extended period of time (covered by several retread lives of the tire) substantially all of the staining antidegradants in a sidewall of the tire will have migrated to the surface and be abraded or washed away. In such an instance an otherwise retreadable tire carcass will be left vulnerable to deterioration by oxygen and ozone.

There is provided in accordance with one aspect of the invention a non-staining elastomeric composition which prior to vulcanization comprises by weight 25 to 90 parts diene rubber, 10 to 75 parts crosslinkable EPDM, 0.5 to 10 phr of a polymeric antidegradant, and a vulcanizing amount of a cure package, said composition being substantially free of staining antidegradants.

There is provided in accordance with a second aspect of the invention an elastomeric article having an outer layer comprising a non-staining elastomeric composition which prior to vulcanization comprises diene rubber, crosslinkable EPDM and a polymeric antidegradant.

There is provided in accordance with a third aspect of the invention a tire comprising a sidewall portion having at least an axially outer layer comprising a non-staining vulcanized elastomeric composition which prior to vulcanization comprises by weight 25 to 90 parts diene rubber, 10 to 75 parts crosslinkable EPDM, 0.5 to 10 phr of a polymeric antidegradant, and a vulcanizing amount of a cure package, said composition being substantially free of staining antidegradants.

There is provided in accordance with a fourth aspect of the invention a tire comprising a sidewall portion having an axially outer layer comprising a non-staining vulcanized elastomeric composition which is substantially free of staining antidegradants and which prior to vulcanization comprises by weight:

(a) 60 to 80 parts of a blend of (i) 35 to 45 parts natural rubber and (ii) 25 to 35 parts polybutadiene rubber;

(b) 25 to 35 parts of a chlorothio-sulfonamide-modified EPDM which is crosslinkable with said blend described in (a) during vulcanization;

(c) 1.0 to 4 parts of a polymeric antidegradant which consists essentially of segmeric units derived from N-(4-anilinophenyl)methacrylamide;

(d) 40 to 60 parts carbon black;

(e) 0.1 to 2 parts stearic acid;

(f) 5 to 15 parts processing oils and/or tackifiers; and (g) a vulcanizing amount of a sulfur cure package.

DISCLOSURE OF THE INVENTION

A vulcanizable composition according to this invention is substantially free of staining antidegradants, which as used herein means that the composition contains less than 0.1 parts per hundred rubber (phr) by weight of staining antidegradants. Most preferably the composition does not contain any staining antidegradants.

A portion of the beneficial properties are imparted to the new composition by means of a "crosslinkable" EPDM (ethylene-propylene-diene-monomer), which is a rubbery terpolymer that has been modified to be crosslinkable, that is to say vulcanizable, with diene rubber. While it is believed that any suitable crosslinkable EPDM may be used in this invention, one example of a crosslinkable EPDM, which has been used in the manufacture of a composition according to this invention, is taught in U.S. Pat. No. 3,970,133. In fact, a preferred crosslinkable EPDM that can be used in the manufacture of the new composition is taught in Example XVII of U.S. Pat. No. 3,970,133.

As taught in U.S. Pat. No. 3,970,133, the starting material for making crosslinkable EPDM is an ethylene-propylene diene terpolymer comprising a mole ratio of ethylene to propylene in the range of about 30/70 to about 70/30 and contains about 0.1 to 0.8 mole of non-conjugated diene termonomer per kilogram of polymer. Preferred are non-conjugated dienes having 6–12 carbon atoms such as 1,4-hexadiene, dicyclopentadiene, 5-ethyldiene-2-norbornene, 5-methylene-2-norbornene, 4,7,8,9-tetrahydroindene, and 1,5-cyclooctadiene. A crosslinkable EPDM useful in the present invention is an admixture of an ethylene-propylene-diene terpolymer and an N-chlorothio-sulfonamide of the formula

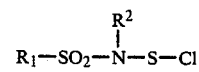

where the mole ratio of said N-chlorothio-sulfonamide to unsaturated site present in the backbone of said terpolymer is in the range of about 0.06/1 to about 1/1, where $R^1$ and $R^2$ are selected from the group consisting of alkyl radicals having 1–20 carbon atoms, aralkyl radicals having 7–20 carbon atoms, alkaryl radicals having from 7–20 carbon atoms, and haloaryl radicals having 6–10 carbon atoms and where $R^1$ is also selected from radicals having the formula

where $R^3$ and $R^4$ are individually selected from said alkyl, aralkyl, and haloaryl radicals and where $R^3$ and $R^4$ can be joined together to represent radicals selected from $-CH_2)_n$, or $-CH_2)_nO-CH_2$, and n is an integer of 4 to 7.

The N-chlorothio-sulfonamide is preferably selected from N-chlorothio-N-methyl-methanesulfonamide, N-chlorothio-N-methyl-benzenesulfonamide, N-chlorothio-N-methyl-p-toluenesulfonamide, N-chlorothio-N-methyl-ethanesulfonamide, N-chlorothio-N-phenyl-p-toluenesulfonamide, N-chlorothio-N-(1-propyl)-p-chlorobenzenesulfonamide, N-chlorothio-N-(2-propyl)-methanesulfonamide, N-chlorothio-N-phenyl-methanesulfonamide, N-chlorothio-N,N',N'-trimethylsulfamide, N-chlorothio-N-methyl-N',N'-(pentamethylene)sulfamide, N-chlorothio-N-methyl-N',N'-diethylsulfamide and N-chlorothio-N-phenyl-benzenesulfonamide.

A portion of the beneficial properties are imparted to the new composition by means of a "polymeric antidegradant," which is also known as a polymer bound antioxidant. That is to say, as used herein a "polymeric antidegradant" is a polymer having at least 15 parts by weight per 100 parts of the polymer of an antidegradant functionality bonded to the polymeric backbone. One example of a monomeric antidegradant used in the preparation of a polymeric antidegradant is N-(4-anilinophenyl)-methacrylamide which is taught in U.S. Pat. No. 4,147,880. The monomeric antidegradant is combined with a diene monomer and polymerized, and then this polymeric antidegradant (masterbatch) is blended with other ingredients of this invention prior to vulcanization.

The polymeric antidegradants employed in the practice of the present invention may be produced either by any known grafting or any known copolymerization techniques that are known in the art.

For example, with respect to grafting, U.S. Pat. No. 4,452,939, which is incorporated by referenced herein, teaches that by modifying a halomethylated latex by reacting the latex with an aqueous solution and an alkali ionizable molecule containing antidegradant properties at a temperature not to exceed 100° C. and in the presence of a nitrogen atmosphere, one can achieve a high level of attachment of the antidegradant moiety onto a polymer. The alkali ionizable molecules containing antidegradant properties include those antidegradants of the amine and hindered phenolic classes. These known antidegradants are generally known by the term chain breaking antioxidants; however, other antioxidants commonly known as peroxide-decomposing antioxidants, ultraviolet screening agents, triplet quenchers and metal deactivators are contemplated herein. Preferably, a grafted polymeric antidegradant comprises 20 to 80 parts by weight of a chain breaking antidegradant radical derived from the group consisting of 2,6-di-t-butyl-mercaptophenol; 4-mercaptoacetamido diphenylamine; 4-mercaptophenol; and 4-mercaptopropionamido diphenylamine.

With respect to making a polymeric antidegradant by copolymerization, U.S. Pat. No. 4,521,574, which is incorporated by reference herein, teaches a process for emulsion copolymerization of functionalized monomers using dichloromethane or tetrahydrofuran as a cosolvent and elevated soap levels in the polymerization. Such a process comprises the aqueous emulsion polymerization of: (a) at least one functionalized monomer that is an antioxidant and contains a polymerizable vinyl group; with (b) at least one copolymerizable conjugated diene monomer selected from the group consisting of butadiene-1,3,2-chlorobutadiene-1,3,isoprene, piperylene and conjugated hexadienes; and optionally (c) at least one vinyl monomer selected from the group consisting of styrene, α-methylstyrene, divinylbenzene, vinyl chloride, vinyl acetate, vinylidene chloride, methyl methacrylate, ethyl acrylate, vinylpyridine, acrylonitrile, methacrylonitrile, methacrylic acid and acrylic acid; the ratio of functionalized monomer to conjugated diene to vinyl monomer can range from 15:65:20 to 95:5:0 parts per hundred based on total monomers; said polymerization taking place in the presence of 8 to 30 parts of an ionic soap per 100 parts of total organic components, (monomers and cosolvents) and 40 to 80 parts of dichloromethane, tetrahydrofuran or combinations thereof based on 100 parts of total monomers. The copolymerizable antioxidant is preferably selected from the group consisting of (a) amides having the following structural formula:

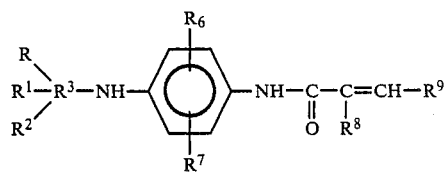

wherein $R^3$ is an aryl radical, R and $R^1$ are selected from the group consisting of hydrogen, alkyl radicals having from 1 to 4 carbon atoms and alkoxy radicals having from 1 to 4 carbon atoms, $R^2$ is selected from the group consisting of hydrogen, alkyl radicals having from 1 to 4 carbon atoms, alkoxy radicals having from 1 to 4 carbon atoms and a radical having the following structural formula:

wherein $R^4$ is selected from the group consisting of alkyl radicals having from 1 to 12 carbon atoms, cycloalkyl radicals having from 5 to 12 carbon atoms, aryl radicals having from 6 to 12 carbon atoms and aralkyl radicals having from 7 to 13 carbon atoms and $R^5$ is selected from the group consisting of hydrogen and alkyl radicals having from 1 to 12 carbon atoms and wherein $R^6$ and $R^7$ are alkyl radicals having from 1 to 4 carbon atoms, $R^8$ is selected from the group consisting of hydrogen, methyl and ethyl; and $R^9$ is hydrogen or phenyl; and (B) imides selected from the group consisting of (1) compounds having the following structural formula:

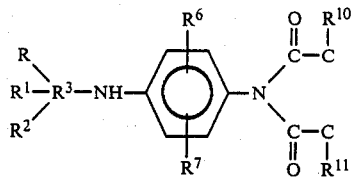

wherein R, $R^1$, $R^2$, $R^3$, $R^6$ and $R^7$ are as previously defined herein under structural Formula I and wherein $R^{10}$ and $R^{11}$ are selected from the group consisting of hydrogen and alkyl radicals having from 1 to 4 carbon atoms and (2) compounds having the following structural formula:

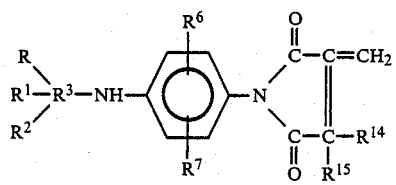

wherein R, $R^1$, $R^2$, $R^3$, $R^6$ and $R^7$ are as previously defined herein under structural Formula I and wherein $R^{14}$ and $R^{15}$ are selected from the group consisting of hydrogen and alkyl radicals having from 1 to 4 carbon atoms.

BEST MODE OF THE INVENTION

Experiment 1—Preparation of Crosslinkable EPDM 117 grams of EPDM with non-conjugated 1,4-hexadiene (unsaturation 0.4 m/kg rubber) was dissolved in 1820 grams of benzene and azeotropically dried under nitrogen. To this was added 0.023 mole of N-chlorothio-N-methyl-p-toluenesulfonamide in 25 ml of dichloromethane solution, and 3.2 grams of powdered anhydrous zinc-chloride. The mixture was stirred under nitrogen for four hours at 30° C. The resulting mixture was combined with two liters of water, causing the brown color of the mixture to disappear. The water layer was separated and the polymer solution washed with an additional liter of water. After separation, one liter of methanol was stirred into the polymer solution giving a two phase mixture from which the upper methanol layer was removed. This procedure was repeated with 600 ml of methanol. Next, one liter of methanol was added with vigorous stirring causing the polymer to form a flocculant precipitate which was filtered, washed thoroughly with acetone, and dried at room temperature.

Experiment 2—Preparation of Polymeric Antidegradant

The copolymerization of a monomeric antidegradant with butadiene to produce the polymeric antidegradant used in this Example is taught in U.S. Pat. No. 4,521,574 at column 8 Table II, example 7 per the following procedure.

(a) a $1.2 \times 10^{-4}$ m$^3$ bottle was charged with the following per 100 parts by weight of total monomers (butadiene plus functional monomer), total monomer charge was 12.5 g.
water: 385 parts
trisodium phosphate: 0.5 parts
azobisisobutyronitrile: 1.5 parts
tert-dodecylmercaptan: 1.0 parts.

There was added to a bottle of the aforesaid mixture:
a. 35 parts of the N-(4-anilinophenylmethacrylamide;
b. 65 parts butadiene;
c. 70 parts dichloromethane (DCM);
d. 17.5 parts sodium dodecylbenzenesulfonate (soap).

The bottle was tumbled in a water bath at 60° C. for 15½ hours, which resulted in at least 95% monomer conversion. The latex was then coagulated in methanol, redissolved in dichloromethane, and reprecipitated from methanol.

The polymeric antidegradant produced in this Experiment consists essentially of segmeric units, a portion of said units consisting of amide segmeric units derived from N-(4-anilinophenyl)methacrylamide.

EXAMPLE

A compound according to the present invention was prepared by the following procedure.

Step 1

A #11 Farrell Banbury was charged with: 37.6 kg of natural rubber, 37.9 kg of polybutadiene rubber, 26.6 kg of crosslinkable EPDM per Experiment 1, 74.4 kg of carbon black, 9.2 kg of processing oil comprising 50% naphthenic process oil and 50% naval stores rosin oil, 5.3 kg of tackifier comprising phenol-formaldehyde resin, 0.9 kg of stearic acid, and 3.6 kg of a polymeric antidegradant prepared according to Experiment 2 comprising a 65/35 butadiene/antidegradant ratio. These ingredients were mixed for 5 minutes until the compound reached a temperature of 149° C.

Step 2

After a rest period of 24 hours the product of step 1 was remilled for 2½ minutes until it reached a temperature of 110° C.

Step 3

The #11 Farrell Banbury was charged with 157.4 kg of the product of step 2, 0.9 kg of cure accelerator comprising 4-morpholinyl-2-benzothiazole disulfide, 18.5 kg of zinc oxide and 2.9 kg of sulfur. These ingredients were mixed for 2 minutes and dropped at a temperature of 116° C.

Step 4

A sample of the product of step 3 was subjected cure conditions of 150° C. and 68.9 Pa for 18 minutes, and was thereby vulcanized.

The vulcanizable composition manufactured in this Example was substantially free of staining antidegradants.

It is believed that any suitable crosslinkable EPDM could be employed in the practice of this invention.

It is believed that any suitable grafted or polymerized polymeric antidegradant containing at least 15 parts by weight per 100 parts polymeric antidegradant of an antidegradant functionality could be used in the practice of this invention.

The diene rubber of the composition may comprise one or more of the following materials: cis 1,4 polyisoprene rubber (either natural or synthetic or a combination of the two), butyl rubber, halobutyl rubber, polybutadiene rubber, and styrene/butadiene rubber. Preferably the diene rubber comprises a blend of weight 25 to 55 parts by weight natural rubber and 10 to 60 parts by weight polybutadiene rubber. This preferred diene rubber has particular utility when the composition is used as the outer layer of the sidewall of a tire.

It is believed that any known sulfur cure package, used in a vulcanizing amount for the particular composition manufactured can be employed in this invention. As used herein a cure package refers to a vulcanizing agent such as, for example, sulfur or peroxide and a suitable vulcanization accelerator or accelerators. A sulfur cure package is used in the outer layer of a sidewall of a tire so that coating materials as taught in U.S. Pat. No. 4,535,114 and U.S. patent application Ser. No. 799,079 filed Nov. 15, 1985, now U.S. Pat. No. 4,668,728, can be used for painting indicium on the sidewall of the tire.

A compound according to this Example was used as the axially outer layer in the sidewall portions of pneumatic tires, and the tires were vulcanized in the manner well known in the tire art.

These tires were subjected to an ozone chamber durability test wherein the tires were mounted upon wheels, inflated, and then rotated against a drum for 300 hours at a speed of about 50 km/hr in a closed atmospheric system having an ozone content of about 30 parts per hundred million (which is significantly higher than the normal atmospheric ozone content of less than 5 parts per hundred million). The sidewalls of the tires containing the new compound had substantially the same degree of ozone cracking as tires having sidewall compounds that are currently being used commercially, and which contain free antioxidants and antiozonants.

Samples of a composition prepared according to the Example herein were tested for migration staining according to ASTM D-925-76 and exhibited an increase in reflectance of from 50% to 70% over samples of compositions containing staining antidegradants. The presence of staining antidegradants on the surface of a rubber article gives the article a dull look, and reduces the reflective property of the surface. This test indicates that staining is not a problem with the new composition.

Samples of a composition prepared according to the Example herein and samples of prior art tire sidewall compositions (which do contain staining antidegradants) were coated with liquid coating materials which auto vulcanized with the samples. (Such coating materials are taught in U.S. Pat. No. 4,535,114.) Within about one month the coating material on the prior art compounds had already been discolored by the migration of staining antidegradants, but the coating on the samples of the new composition had not been discolored.

It will be apparent to those skilled in the art of rubber compounding that various modifications may be made to the compounds disclosed herein without deviating from the scope of the claimed invention.

What is claimed is:

1. A tire having an outer layer in a sidewall comprising a nonstaining elastomeric composition which prior to vulcanization comprises by weight 25 to 90 parts diene rubber, 10 to 75 parts of EPDM that has been modified to increase its crosslinkability to diene rubbers, 0.5 to 10 phr of either a grafted or copolymerized antidegradant and a vulcanizing amount of a sulfur cure package, said composition being substantially free of staining antidegradants.

2. A tire according to claim 1 wherein said polymeric antidegradant consists essentially of segmeric units, a portion of said units consisting of amide segmeric units derived from N-(4-anilinophenyl)methacrylate.

3. A tire according to claim 1 wherein said EPDM is a chlorothio-sulfonamide-modified rubber terpolymer.

4. A tire according to claim 2 wherein said EPDM is a chlorothio-sulfonamide-modified rubber terpolymer.

* * * * *